3,758,468
1-ALKYL-6-AZAURACIL COMPOUNDS AND PREPARATIONS

Jasper Daams and Johannes Kuipers, Weesp, and Christoffel Willem Piuijgers, Utrecht, Netherlands, assignors to U.S. Philips Corporation, New York, N.Y.
No Drawing. Filed June 17, 1970, Ser. No. 47,175
Claims priority, application Netherlands, June 18, 1969, 6909255
Int. Cl. C07d 55/10
U.S. Cl. 260—248 AS                           4 Claims

ABSTRACT OF THE DISCLOSURE

It has been found that 1-alkyl-6-azauracil compounds in which the alkyl group contains from 1 to 12 carbon atoms have a strong growth-inhibiting effect in plants, in particular grasses. After being worked up into the usual preparations the compounds can be used for keeping short vegetation, in particular turf. The practical use on lawns has the further advantage that the quality of the turf is improved.

---

From "Chemical Abstracts" 55, p. 18739 (1961) the following compounds are known: 1-methyl-6-azauracil, 1-ethyl-6-azauracil, 3-methyl-6-azauracil, 3-ethyl-6-azauracil, 1,3-dimethyl-6-azauracil and 1,3-diethyl-6-azauracil.

It is also known that the compound 3-methyl-6-azauracil has a growth inhibiting action on grasses (Netherlands patent application 6612881).

Further investigation has shown that 3-ethyl-6-azauracil and 3-dodecyl-6-azauracil have no growth inhibiting action on grasses. It has further been found that 1,3-dimethyl-6-azauracil and 1,3-diethyl-6-azauracil also have no plant growth inhibiting effects.

This would appear to lead to the conclusion that the growth inhibiting activity of alkyl-substituted 6-azauracil is attached to a methyl group at position 3 of the azauracil molecule.

Surprisingly, however, it has now been found that the introduction of an alkyl group containing from 1 to 12 carbon atoms at position 1 of 6-azauracil results in compounds all of which have a strong growth inhibiting effect on plants, in particular on grasses. It has further been found that salts of these compounds such as, for example, alkali metal salts or salts formed with amines, for example triethanol amine, have similar growth-inhibiting effects. For the entire group of the 1-alkyl-compounds the activity is equal to that of the 3-methyl compound. The 1-propyl derivative of 6-azauracil even has a stronger activity than the 3-methyl derivative.

Strikingly, in the aforementioned Dutch patent application no attention at all is paid to 1-substituted 6-azauracil compounds.

However, it should be borne in mind that the 1,6-azo group present in the 6-azauracil molecule chemically is widely different from, and in particular is much less reactive than, the other groups in the relevant molecule, so that substitution at the azo group is not obvious.

That nevertheless a high and interesting activity of 1-alkyl-substituted compounds and their salts has been found is to be regarded as highly unexpected and surprising, the more so if it is borne in mind that, apart from the 3-methyl substituted compound, the 3-alkyl and the 1,3-dialkyl derivatives of 6-azauracil do not exhibit any growth-inhibiting effects.

Further investigation into the biological activities of 1-alkyl-6-azauracil compounds according to the invention and of their salts has shown that this group of substances also has a fungicidal activity and possesses substantially no phytotoxicity.

For example, both post-emergence and pre-emergence treatments with various 1-alkyl-6-azauracil compounds and their salts in a dosage of 10 kg. per hectare have been carried out.

The results show that with the dosage used substantially no damage is done to the following plants: dwarf french beam, tomato, oat, beet, chickweed, cornspurry, stinging nettle, groundsel, slender foxtail, cleavers, black bindweed, orach frenchweed, nightshade white mustard, annual meadow-grass, millet, common garden cress, amaranth and spotted persicary. Growth retardation, however, has been observed in these tests. In the biological evaluation investigation into the growth-inhibiting effects of 1-alkyl-6-azauracil compounds and their salts on grasses aqueous suspensions of the said substances in dosages of 2.5, 5 and 10 kg. of active material per hectare have been sprayed on lawn grass consisting of 40% of brown bent-grass and 60% of red fescue.

The growth inhibition was determined two weeks and five weeks after the treatment. One of the results of these tests is that the compounds 1-methyl-6-azauracil, 1-ethyl-6-azauracil, 1-propyl-6-azauracil, 1-butyl-6-azauracil and their salts when used in amounts of 5 kg. per hectare still produce a substantially complete growth inhibition after 5 weeks. The 1-propyl-6-azauracil and its sodium salt even produce complete growth inhibition after 5 weeks when used in an amount of 2.5 kg. per hectare.

The 1-hexyl-6-azauracil has a slightly weaker effect, but still it can be used to advantage in a dosage of 10 kg. per hectare, since at this dosage it will produce a pronounced growth inhibition even after 4 weeks.

By means of the aforementioned and similar tests it has further been found that the use of 1-alkyl-6-azauracil compounds or their salts on lawns improve the turf quality. It has been found that the root system of the species of grass treated shows more intense ramification and that the colour of the grass is clearly improved.

It has also been found that 1-alkyl-6-azauracil compounds and their salts prevent or retard the seed production of various plants such as, for example, annual meadow-grass (Poa annua) and wild coat (Avena fatua). Owing to this property a lawn of good quality will be maintained in a good condition for a longer time if it is treated with 1-alkyl-6-azauracil compounds or their salts, for in turf the desirable grass varieties will often be crowded out by annual poa owing to the strong generative power of this weed. By a treatment with 1-alkyl-6-azauracil compounds the seed production of annual poa and hence its competitive power will be greatly reduced.

Wild oat can also be controlled by means of 1-alkyl-6-azauracil compounds by virtue of their effects on flowering and seed production. In practice, wild oat will reach seed ripening more quickly than cultivated plants such as wheat or barley and hence will seed early. It has now been found that in respect of seed production wild oat is more sensitive to 1-alkyl-6-azauracil compounds than are for example wheat or barley. In dosages of at least 0.5 kg. of active substance per hectare these compounds greatly reduce and retard the seed production of wild oat.

Because of their activity the 1-alkyl-6-azauracil compounds according to the invention and their salts may be used in compositions for keeping short the vegetation in particular of turf such as lawns, sports fields, aerodromes, road verges and strips of turf in orchards.

For this purpose the active substances are worked up by known methods into the usual formulations such as aqueous dispersions, oil solutions, oil dispersions, miscible oils, pastes, dusts, wettable powders, granules, invert emulsions, fumigating candles and aerosols. In these preparations the active substance is mixed with a solid or liquid inert carrier material to which adjuvants such as, for example, surface-active substances, disintegrating agents, lubricants and adhesives may be added.

Wettable powders, pastes and miscible oils are also preparations in concentrated form which are diluted with water before or during use.

The invert emulsions are mainly used in air application, large areas being treated with comparatively small amounts of preparation. The invert emulsion may be prepared in the spraying appliances shortly before or even during the spraying operation by emulsifying water in an oil solution or oil dispersion of the active substance. Hereinafter some formulations will be described more fully by way of example, but it should be noted that to one skilled in the art the production of these and similar known preparations will not provide difficulty.

Granular preparations are produced, for example, by taking up the active substance in a solvent, the resulting solution, as the case may be in the presence of a binder, being used to impregnate a granular carrier material such as porous granules (for example pumice and attaclay), mineral non-porous granules (sand or ground marl) or organic granules (for example, dried coffee grounds and cut tobacco stems).

A granular preparation may alternatively be produced by compressing the active substance together with powdered minerals in the presence of lubricants and binders, the pressings being disintegrated and strained to the desired grain size.

Dusts are obtainable by intimately mixing the active substance with an inert solid carrier material, for example in a concentration from 1% to 50% by weight. Examples of suitable carrier materials are talcum, kaolin, pipe clay, diatomaceous earth, dolomite, gypsum, chalk, bentonite, attapulgite and colloidal $SiO_2$ or mixtures of these and similar substances. Organic carrier materials such as, for example, ground walnut shells may also be used.

Wettable powders may be prepared by mixing from 10 to 80 parts by weight of a solid inert carrier such as, for example, one or more of the above-mentioned carrier materials with from 10 to 80 parts by weight of the active substance, from 1 to 5 parts by weight of a dispersing agent such as, for example, the lignin sulfonates or alkyl naphthalene sulfonates known for this purpose, and preferably also with from 0.5 to 5 parts by weight of a wetting agent, such as one of the fatty alcohol sulfates, alkyl aryl sulfonates or fatty acid condensation products, for example, those known under the trademark Igepon.

For the production of miscible oils the active compound is dissolved, or finely divided, in a suitable solvent which preferably is poorly miscible with water, an emulsifier being added to the solution. Suitable solvents are, for example, xylene, toluene, high-aromatic petroleum distillates, for example solvent naphtha, distilled tar oil and mixtures of these liquids. Suitable emulsifying agents are, for example, alkylphenoxypolyglycol ethers, polyoxyethylene sorbitan esters of fatty acids or polyoxyethylene sorbitol esters of fatty acids. The concentration of the active compound in these miscible oils is not restricted within narrow limits and may vary between 2% and 50% by weight. In addition to a miscible oil, there may be mentioned as a liquid and highly concentrated primary composition a solution of the active substance in a liquid which is satisfactorily miscible with water, for example acetone, to which solution a dispersing agent and, as the case may be, a wetting agent is added. On dilution with water shortly before, or during, the spraying operation an aqueous dispersion of the active substance is obtained.

An aerosol preparation according to the invention is obtained in the usual manner by incorporating the active substance, if required in the form of a solution, in a volatile liquid to be used as a propellant such as, for example, the mixture of chlorine and fluorine derivatives of methane and ethane commercially available under the trade name "Freon."

Fumigating candles or fumigating powders, i.e. preparations which are capable of developing a pesticidal smoke when burning, are obtained by absorbing the active substance in a combustible mixture which may contain, form, as a fuel, a substance to maintain combustion such as, for example, ammonium nitrate or potassium chlorate and further a substance to retard combustion, for example kaolin, bentonite and/or colloidal silicic acid.

In addition to the above-mentioned ingredients the preparations according to the invention may contain further substances which are known for use in such preparations.

For example, to a wettable powder or a mixture to be granulated there may be added a lubricant such as calcium stearate or magnesium stearate. Also "adhesives" such as polyvinyl alcohol cellulose derivatives or other colloidal materials, such as casein, may be added to improve the adherence of the pesticide to the surface to be protected.

In addition to the active compounds according to the invention, other biologically active compounds and preferably herbicides may advantageously be included in the preparations according to the invention.

This ensures that when such a composition according to the invention is used, for example on lawns, not only is the vegetation kept short but also the weeds in the lawn are controlled.

Examples of herbicidal compounds suitable for use in the said composition are:

Quaternary herbicides such as:
  1,1'-ethylene-2,2'-dipyridylium-dibromide (diquat),
  1,1'-dimethyl-4,4'-dipyridylium-dibromide (paraquat)
Triazines such as:
  2-chloro-4,6-bisethylamino-s-triazine (simazine),
  2-chloro-4-ethylamino-6-isopropylamino-s-triazine (atrazine)
  2-chloro-4,6-bisisopropylamino-s-triazine (propazine)
Urea derivatives such as:
  1-phenyl-3,3-dimethylurea (fenuron),
  1(4'-chlorophenyl)-3,3-dimethylurea (monuron),
  1-(4'-chlorophenyl)-3-methoxy-3-methylurea (monolinuron),
  1-(4'-chlorophenyl)-3-[3-(butyn-1)]-3-methylurea (buturon),
  1-(4'-bromophenyl)-3-methoxy-3-methylurea (metobromuron),
  1-(3',4'-dichlorophenyl)-3,3-dimethylurea (diuron),
  1-(3',4'-dichlorophenyl)-3-methoxy-3-methylurea (linuron),
  1-(3',4'-dichlorophenyl)-3-butyl-3-methylurea (neburon),
  1-(3'-chloro-4'-bromophenyl)-3-methoxy-3-methylurea (C 6313),
  1-(3'-trifluoromethylphenyl)-3,3-dimethylurea (fluometron)
Phenols such as:
  2,6-dichloro-4-cyanophenol (chloroxynil),
  2,6-dibromo-4-cyanophenol (bromoxynil),
  2,6-diiodo-4-cyanophenol (ioxynil),
  4,6-dinitro-orthocresol (DNOC),
  2-sec.butyl-4,6-dinitrophenol (dinoseb),
  pentachlorophenyl (PCP)
Chlorinated fatty acids:
  monochloroacetic acid (SMCA),
  trichloroacetic acid (TCA),
  α,α-dichloropropionic acid (delapon),
  α,α,α-trichloropropionic acid (TCP).
Mixed:
  3-amino-1,2,4-triazole (amitrol),
  3,6-endoxo hexahydrophthalic acid (endothal),
  maleic acid hydrazide (MH),
  2,3,6-trichlorobenzoic acid (TBA),
  2-methoxy-3,6-dichlorobenzoic acid (dicamba), 1-(3',4'-dichlorophenyl)-3-methyl-2-pyrrolidinon (BV 201),
1-(3'-chloro-4'-methylphenyl)-3-methyl-2-pyrrolidinon (BV 207),
N,N-dimethyl-2,2-diphenylacetonide (diphenamide),
2,3,5-trichloropyridon-4 (daxtron),
4-amino-3,5,6-trichloro-α-picolinic acid (tordon),
5-amino-4-chloro-2-phenyl-3-(2H)-pyridazinon (Pyramin),
2-cyclohexyl-5,6-trimethylene uracil (lenacil),
2,6-dinitro-N,N-dipropyl-a,a,a-trifluoro-p-toluidine (trifluralin),
2,6-dinitro-4-methylsulphonyl-N,N-dipropyl-aniline (Blanadin),
5-bromo-6-methyl-3-(1-methylpropyl)uracil (bromacil),
3-amino-2,5-dichlorobenzoic acid (amiben),
2,3,6-trichlorophenylacetic acid (fenac),
2,6-dichloro-3-methoxybenzoic acid (mediben),
N-(3-chlorophenyl)-isopropylcarbamate (CIPC),
2,6-dichlorobenzonitrile (dichlobenil).

It may also be of importance to include in the preparations according to the invention not only the compounds according to the invention and the aforementioned herbicidal substances but also fertilizers. This has the obvious advantage that, for example, in treating lawns with such compositions the aforementioned improvement in the turf quality due to the compounds according to the invention is increased by the fertilizer.

In practice, the desirable dosage of the preparation according to the invention depends on various factors. Thus, the selected active compound, the formulation and the type of turf to be treated will influence the dosage. In general, good results will be obtained with a dosage which corresponds to from 0.5 to 10 kg. of active constituent per hectare.

The group of the compound according to the invention comprises known and novel compounds.

Unknown so far are 1-alkyl-6-azauracil compounds in which the alkyl group contains more than 2 carbon atoms.

The new substances according to the invention may be synthesized by methods known for producing similar compounds or by related methods.

Thus, the new compounds according to the invention may be obtained by
(a) Treating 2-alkyl semicarbazone of glyoxylic acid with an alcoholic Na-solution and acidifying the reaction product,
(b) Treating 2-alkyl-3-thioalkyl-as-triazin-5-one with an aqueous solution of an acid,
(c) Reacting 6-azauracil under alkaline conditions with an alkyl iodide and acidifying the reaction mixture.

The alkyl group present in the starting materials of the aforementioned methods (a) and (b) and the alkyl iodide used in method (c) include from 3 to 12 carbon atoms.

The thioalkyl group mentioned in method (b) contains 1 or 2 carbon atoms.

It has further been found that the new compounds according to the invention and the known 1-methyl-6-azauracil and 1-ethyl-6-azauracil can be produced by a method not known from the literature.

According to the new method, which gives high yields, 2-alkyl-3-thioalkyl-as-triazine-5-one in which the alkyl group contains from 1 to 12 carbon atoms and the thioalkyl group 1 to 2 carbon atoms is treated at an elevated temperature with an aqueous solution of a base such as an aqueous solution of an alkali metal hydroxide, for example NaOH or KOH.

The salts of 1-alkyl-6-azauracil compounds are obtained by treating 1-alkyl-6-azauracil with a base such as, for example, an alkali metal hydroxide or an alkali metal alcoholate.

The invention will now be described more fully with reference to the following examples.

EXAMPLES (1) Production of 1-methyl-6-azauracil 42 g. of 2-methyl-3-thiomethyl-as-triazin-5-one are heated in a solution of 14 g. of NaOH in 250 ml. of water. The reaction mixture is agitated at 70° C. for one hour.

The reaction mixture is then cooled and the resulting precipitate is drawn off, washed with water and dried. The 1-methyl-6-azauracil obtained has a melting point of 159° C.

(2) Production of 1-propyl-6-azauracil 10.5 g. of Na is dissolved in 250 ml. of absolute ethanol and to this solution there is added a solution of 24.8 g. of 2-propyl-semicarbazone of dioxylic acid in 580 ml. of ethylene glycol. The mixture is boiled under a reflux condenser for 14 hours and subsequently the solvents are distilled off. The residue is taken up in 200 ml. of water and the solution is acidified with 4 N HCl. The resulting 1-propyl-6-azauracil is drawn off and dried. Melting point 106° C.

In an analogous manner 1-butyl-6-azauracil having a melting point of 104–105° C. has been produced.

(3) Production of 1-hexyl-6-azauracil 21.4 g. of 2-hexylsemicarbazone of dioxylic acid is dissolved in 400 ml. of ethylene glycol. To this solution there is added a solution of 6.9 g. of sodium in 200 ml. of absolute ethanol and the mixture is boiled under a reflux condenser for 24 hours. Then the solvents are distilled off at a reduced pressure and the residue is taken up in 200 ml. of water. The resulting solution is acidified with 1 N HCl and the resulting precipitate is drawn off and dried. The melting point of the 1-hexyl-y-azauracil obtained is 85° C.

(4) Production of the sodium salt of 1-propyl-6-azauracil 0.69 g. of sodium is dissolved in 300 ml. of methanol and to this solution there is added 4.65 g. of 1-propyl-6-azauracil. After evaporation to dryness, 5.3 g. of sodium salt of 1-propyl-6-azauracil is obtained which has a melting point of 226–230° C.

What is claimed is:

1. A compound selected from the group consisting of a compound of the formula

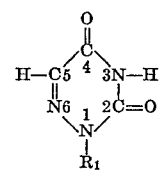

in which formula $R_1$ is alkyl of from 3 to 12 carbon atoms and a salt thereof.

2. A method of producing a compound of claim 1 comprising the steps heating a 2-alkyl-3-thioalkyl-as-triazine-5-one wherein the alkyl group contains from 1 to 12 carbon atoms and the thioalkyl group contains from 1 to 2 carbon atoms with an aqueous solution of an alkali metal hydroxide.

3. The method of claim 2 wherein 1-propyl-6-azauracil is produced.

4. 1-propyl-6-azauracil and its salts.

(References on following page)